United States Patent
Bhide et al.

(10) Patent No.: US 9,311,368 B2
(45) Date of Patent: *Apr. 12, 2016

(54) SLOWLY CHANGING DIMENSION ATTRIBUTES IN EXTRACT, TRANSFORM, LOAD PROCESSES

(75) Inventors: Manish A. Bhide, New Delhi, IN (US); Srinivas Kiran Mittapalli, Secunderabad, IN (US); Sriram Padmanabhan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 476 days.

This patent is subject to a terminal disclaimer.

(21) Appl. No.: 13/618,158

(22) Filed: Sep. 14, 2012

(65) Prior Publication Data

US 2013/0124454 A1 May 16, 2013

Related U.S. Application Data

(63) Continuation of application No. 13/293,196, filed on Nov. 10, 2011.

(51) Int. Cl.
*G06F 17/30* (2006.01)
(52) U.S. Cl.
CPC ................................ *G06F 17/30563* (2013.01)
(58) Field of Classification Search
USPC ........................................................ 707/602
See application file for complete search history.

(56) References Cited

U.S. PATENT DOCUMENTS

| | | | |
|---|---|---|---|
| 6,847,973 B2 * | 1/2005 | Griffin et al. | 707/999.101 |
| 2006/0282429 A1 | 12/2006 | Hernandez-Sherrington et al. | |
| 2007/0239769 A1 * | 10/2007 | Fazal et al. | 707/102 |
| 2009/0006146 A1 | 1/2009 | Chowdhary et al. | |
| 2009/0276449 A1 | 11/2009 | Syed et al. | |
| 2010/0280990 A1 | 11/2010 | Castellanos et al. | |
| 2011/0125705 A1 | 5/2011 | Aski et al. | |
| 2012/0158642 A1 * | 6/2012 | Ebrahimi et al. | 707/600 |
| 2013/0124453 A1 | 5/2013 | Bhide et al. | |

OTHER PUBLICATIONS

Proceedings of the 10th European Conference on Knowledge Management, Università Degli Studi di Padova, Vicenza, Italy, Sep. 3-4, 2009, edited by Ettore Bolisani and Enrico Scarso, 98 pages.

* cited by examiner

*Primary Examiner* — Khanh Pham
(74) *Attorney, Agent, or Firm* — Susan Murray; Edell, Shapiro & Finnan, LLC

(57) ABSTRACT

A computer-implemented method, computer program product and a system for identifying and handling slowly changing dimension (SCD) attributes for use with an Extract, Transform, Load (ETL) process, comprising importing a data model for dimensional data into a data integration system, where the dimensional data comprises a plurality of attributes, identifying via a data discovery analyzer one or more attributes in the data model as SCD attributes, importing the identified SCD attributes into the data integration system, selecting a data source comprising dimensional data, automatically generating an ETL job for the dimensional data utilizing the imported SCD attributes, and executing the automatically generated ETL to extract the dimensional data from the data source and loading the dimensional data into the imported SCD attributes in a target data system.

20 Claims, 16 Drawing Sheets

| SALESPERSON TABLE (TYPE 0) 200a ||||||
|---|---|---|---|---|---|
| SALESPERS_KEY 205 | SALESPERS_ID 210 | SALESPERS_FIRSTNAME 215 | SALESPERS_LASTNAME 220 | SALESPERS_SSN 225 | BUSINESS_GROUP 230 |
| 1000 | J_DOE | JOHN | DOE | 111223333 | SE |
| 1001 | J_GARCIA | JUAN | GARCIA | 222334444 | SW |
| 1002 | J_SMITH | JANE | SMITH | 333445555 | NE |
| ... | ... | ... | ... | ... | ... |

FIG.4A

| SALESPERSON TABLE (TYPE 1) 200b ||||||
|---|---|---|---|---|---|
| SALESPERS_KEY 205 | SALESPERS_ID 210 | SALESPERS_FIRSTNAME 215 | SALESPERS_LASTNAME 220 | SALESPERS_SSN 225 | BUSINESS_GROUP 230 |
| 1000 | J_DOE | JOHN | DOE | 111223333 | NE |
| 1001 | J_GARCIA | JUAN | GARCIA | 222334444 | MW |
| 1002 | J_SMITH | JANE | SMITH | 333445555 | NE |
| ... | ... | ... | ... | ... | ... |

FIG. 4B

| SALESPERSON TABLE (TYPE 2) 200c ||||||||
|---|---|---|---|---|---|---|---|
| SALESPERS_KEY 205 | SALESPERS_ID 210 | SALESPERS_FIRSTNAME 215 | SALESPERS_LASTNAME 220 | SALESPERS_SSN 225 | BUSINESS_GROUP 230 | START_DATE 235 | END_DATE 240 |
| 1000 | J_DOE | JOHN | DOE | 111223333 | SE | 2-JAN-1995 | 18-JUN-2005 |
| 2000 | J_DOE | JOHN | DOE | 111223333 | NE | 19-JUN-2005 | 12-DEC-2010 |
| 1001 | J_GARCIA | JUAN | GARCIA | 222334444 | SW | 4-MAR-1997 | 20-APR-1999 |
| 2001 | J_GARCIA | JUAN | GARCIA | 222334444 | PAC | 21-APR-1999 | 22-FEB-2003 |
| 3001 | J_GARCIA | JUAN | GARCIA | 222334444 | MW | 23-FEB-2003 | |
| 1002 | J_SMITH | JANE | SMITH | 333445555 | NE | 8-JUL-2001 | |
| ... | ... | ... | ... | ... | ... | ... | ... |

FIG.4C

| SALESPERS_KEY 205 | SALESPERS_ID 210 | SALESPERS_FIRSTNAME 215 | SALESPERS_LASTNAME 220 | SALESPERS_SSN 225 | BUSINESS_GROUP 230 | VERSION 245 |
|---|---|---|---|---|---|---|
| 1000 | J_DOE | JOHN | DOE | 111223333 | SE | 0 |
| 2000 | J_DOE | JOHN | DOE | 111223333 | NE | 1 |
| 1001 | J_GARCIA | JUAN | GARCIA | 222334444 | SW | 0 |
| 2001 | J_GARCIA | JUAN | GARCIA | 222334444 | PAC | 1 |
| 3001 | J_GARCIA | JUAN | GARCIA | 222334444 | MW | 2 |
| 1002 | J_SMITH | JANE | SMITH | 333445555 | NE | 0 |
| ... | ... | ... | ... | ... | ... | ... |

SALESPERSON TABLE (TYPE 2) 200d

FIG.4D

| SALESPERSON TABLE (TYPE 3) 200e | | | | | | | |
|---|---|---|---|---|---|---|---|
| SALESPERS_KEY 205 | SALESPERS_ID 210 | SALESPERS_FIRSTNAME 215 | SALESPERS_LASTNAME 220 | SALESPERS_SSN 225 | ORIGINAL_BUSINESS _GROUP 250 | EFFECTIVE _DATE 255 | CURRENT_BUSINESS _GROUP 260 |
| 1000 | J_DOE | JOHN | DOE | 111223333 | SE | 19-JUN-2005 | NE |
| 1001 | J_GARCIA | JUAN | GARCIA | 222334444 | SW | 23-FEB-2003 | MW |
| 1002 | J_SMITH | JANE | SMITH | 333445555 | NE | 8-JUL-2001 | NE |
| ... | ... | ... | ... | ... | ... | ... | ... |

SLOWLY CHANGING DIMENSION ATTRIBUTES IN EXTRACT, TRANSFORM, LOAD PROCESSES

CROSS-REFERENCE TO RELATED APPLICATIONS

This application is a continuation of U.S. patent application Ser. No. 13/293,196, entitled "Slowly Changing Dimension Attributes in Extract, Transform, Load Processes" and filed Nov. 10, 2011, the disclosure of which is incorporated herein by reference in its entirety.

BACKGROUND

1. Technical Field

The present invention relates generally to information warehouse systems, and more particularly to identifying and handling slowly changing dimension attributes in order to improve Extract, Transform, Load processing.

2. Discussion of Related Art

Enterprises are building increasingly large information warehouses to enable advanced information analytics and to improve the business value of information. The data in the warehouses are loaded via Extract, Transform, Load (ETL) processes, which extract data from a source, transform the data into a suitable form according to particular business needs, and then load the data into the warehouse(s). Establishing a structure for performing an ETL process is time-consuming, and complex, and there is no automated way to identify and handle slowly changing dimension attributes while building ETL jobs.

BRIEF SUMMARY

Accordingly, embodiments of the present invention include a computer-implemented method, computer program product and a system for identifying and handling slowly changing dimension (SCD) attributes for use with an Extract, Transform, Load (ETL) process, comprising importing a data model for dimensional data into a data integration system, where the dimensional data comprises a plurality of attributes, identifying, via a data discovery analyzer, one or more attributes in the data model as SCD attributes, importing the identified SCD attributes into the data integration system, selecting a data source comprising dimensional data, automatically generating an ETL job for the dimensional data utilizing the imported SCD attributes, and executing the automatically generated ETL to extract the dimensional data from the data source and loading the dimensional data into the imported SCD attributes in a target data system.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIGS. 4A through 4E are diagrammatic illustrations of example data source tables according to various embodiments of the present invention.

DETAILED DESCRIPTION

Figure 1:
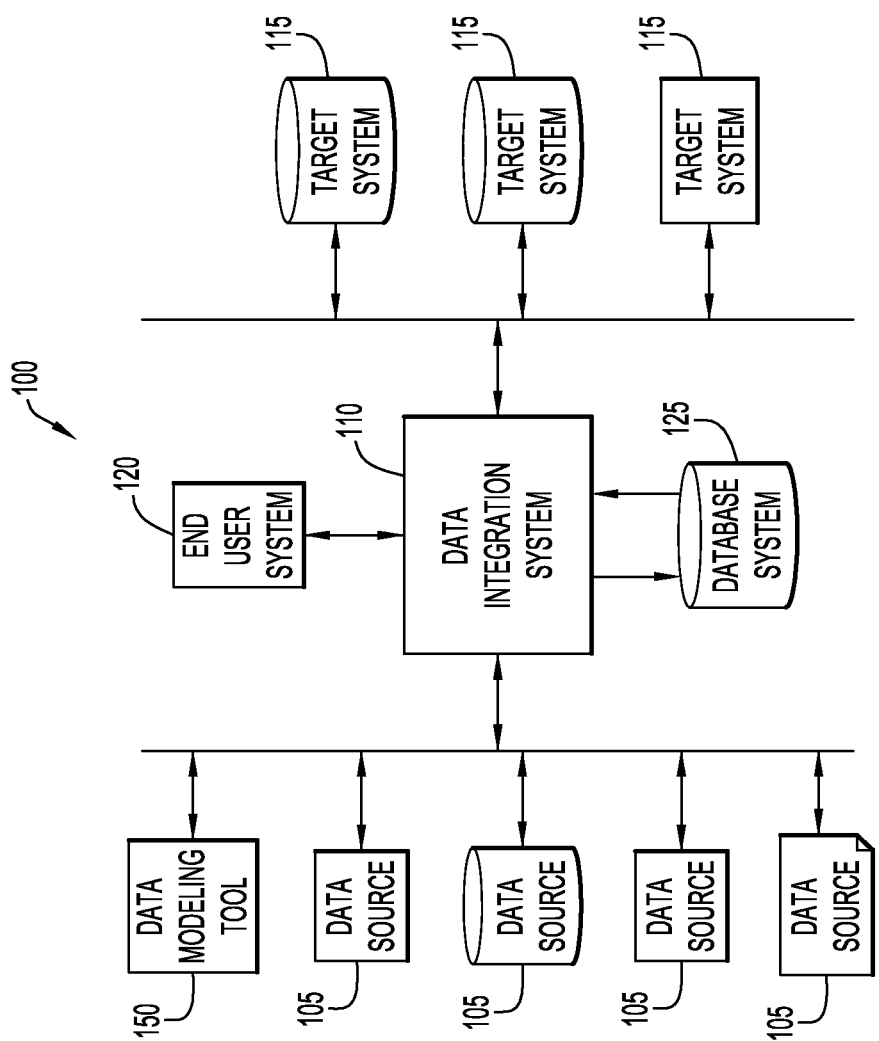
FIG. 1 is a block diagram illustrating a computing platform employed by an information warehouse system according to an embodiment of the present invention.

Referring now to the Figures, an exemplary computing platform or system 100 according to an embodiment of the present invention is illustrated in FIG. 1. The exemplary computing platform 100 comprises one or more data sources 105, a data integration system 110, one or more target systems 115, one or more end-user systems 120, and a database system 125. The platform or system 100 facilitates integration of data from various data sources 105 in different formats into the target systems 115.

The data sources 105 may include a wide variety of databases or storage structures residing at the same or different locations on one or more networks or systems. The target systems 115 may be in the form of computer systems, and may include databases (e.g., a data warehouse) or processing platforms used to further manipulate the data from the data integration system 110. The data sources 105 and target systems 115 may be implemented by any quantity of any type of conventional or other databases (e.g., network, hierarchical, relational, object, etc.) or storage structures (e.g., files, data structures, web-based storage, disk or other storage, etc.) and may comprise enterprise data sources (e.g., an IBM® DB2® database; IBM and DB2 are trademarks of International Business Machines Corporation, registered in many jurisdictions worldwide), personal and intra-organization data sources (e.g., spreadsheets, databases, etc.), or web-based data sources such as public databases (e.g., tax records, real estate records, court documents, etc.) and the like. The databases may store any desired information arranged in any fashion (e.g., tables, hierarchical, relations, objects, etc.), and may store additional information such as metadata in addition to data.

The data integration system 110 may be in the form of a computer system, and may perform a number of functions, such as an ETL process to extract data from data sources 105, transform the extracted data, and provide the extracted and transformed data to target systems 115. The data integration system 110 may send commands to one or more of the data sources 105 such that the data source 105 provides data to the data integration system 110.

The depicted platform or system 100 further comprises one or more end-user systems 120, which allow a user to interface with the platform or system 100. Although a single end-user system 120 is shown as interacting with the data integration system 110, it is understood that additional end-user systems 120 may interact with the data integration system 110, one or more of the data sources 105, and/or one or more of the target systems 115. The end-user systems 120 may present a graphical user or other interface (e.g., command line prompts, menu screens, etc.) to solicit information from users that pertain to the desired tasks to be performed (e.g., transformation of data) and to associate information (e.g., resource requirements, parameters, etc.). The end-user systems 120 communicate information to the data integration system 110 so that the data integration system may utilize the information to cleanse, combine, transform or otherwise manipulate the data it receives from the data sources 105 and provide the manipulated data to target systems 115.

The data integration system 110, target system 115 and end-user system 120 may each be implemented in the form of a processing system, or may be in the form of software, or a combination of both. They can each be implemented by any quantity of conventional or other computer systems or devices (e.g., computer terminals, personal computers of all types (e.g., including tablets, laptops, netbooks, etc.), or cellular telephones/personal data assistants of all types, and may include any commercially available operating systems for all types of computer hardware and any commercially available or custom software (e.g., browser software, communications software, word processing software, etc.). As described further with respect to FIG. 3, these systems may include processors, memories (e.g., RAM, cache, flash, ROM, solid-state, hard-disk, etc.), internal or external communications devices (e.g., modem, network adapter, etc.), I/O interfaces, output devices (e.g., displays, printers, etc.), and input devices (e.g., physical keyboard, touch screen, mouse, trackpad, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

The platform or system 100 may also include a database or database management system 125. The database system 125 may be used to store metadata or other information for the data integration system 110. For example, the data integration system 110 may collect data from one or more data sources 105 and transform the data into forms that are compatible with one or more target systems 115 in accordance with the information in database system 125. Once the data is transformed, the data integration system 110 may store the data in the database system 125 for later retrieval. By way of example, the database system 125 may be in the form of a database server. The platform or system 100 may also include a data modeling tool, for example IBM® InfoSphere® Data Architect, from which data models can be imported into the platform or system 100. IBM and InfoSphere are trademarks of International Business Machines Corporation, registered in many jurisdictions worldwide.

It is understood that any of the various components of the platform or system 100 may be local to one another, or may be remote from and in communication with one or more other components via any suitable communication means or devices, for example a network such as a WAN, a LAN, Internet, Intranet, mobile wireless, etc. In one embodiment, the various components are communicatively connected to each other, for example, via network connections that represent any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement.

The platform or system 100 may include additional servers, clients, and other devices not shown, and individual components of the system may occur either singly or in multiples. For example, there may be more than four data sources 105, more than one data integration system 110, more than three target systems 115, etc.

Figure 2:
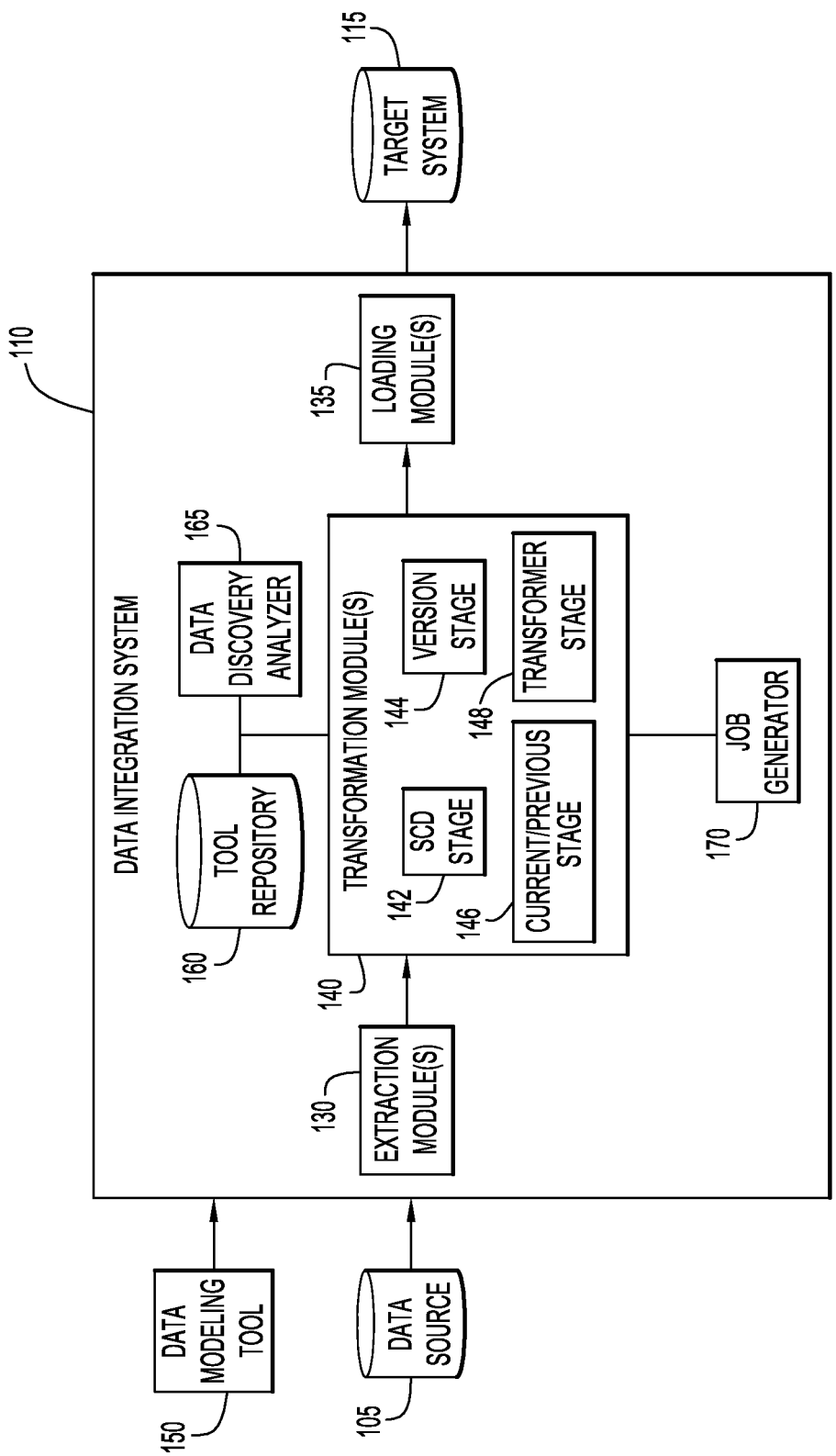
FIG. 2 is a block diagram illustrating a data integration system usable in a computing platform according to an embodiment of the present invention.

FIG. 2 depicts an example of a data integration system 110 usable in a computing platform 100 according to an embodiment of the present invention. The data integration system 110 comprises various components, including one or more extraction modules 130, one or more transformation modules 140, and one or more loading modules 135, as well as a tool repository 160, data discovery analyzer 165, and ETL job generator 170. The transformation module(s) 140 comprise one or more modules such as the depicted SCD stage 142, version stage 144, current/previous stage 146, and transformer state 148.

Each of the components of data integration system 110 may be implemented by any combination of software and/or hardware modules or processing units. The operation of each component in the data integration system 110 is more fully described with reference to FIGS. 5-12, however the overall operation may be summarized as the extraction module(s) 130 importing data models from data modeling tool 150 and extracting data from one or more data sources 105, the transformation module(s) 140 analyzing and transforming the data model and the data, and the loading module(s) 135 generating output of the transformed data for one or more target systems 115. It is understood that the functionality of any one of these components (e.g., extraction module(s) 130 and transformation module(s) 140) may be combined into a single device or process or split among multiple devices or processes.

The data integration system 110 may be an ETL engine such as an IBM® InfoSphere® DataStage®, Informatica PowerCenter, or Oracle Warehouse Builder engine. The data discovery analyzer 165 may be, for example, an IBM® Information Analyzer or IBM® InfoSphere® Discovery tool, and the job generator 170 may be, for example, an IBM® InfoSphere® FastTrack tool. IBM, DataStage, Information Analyzer, and InfoSphere are trademarks of International Business Machines Corporation, registered in many jurisdictions worldwide. Other product and service names might be trademarks of other companies.

Figure 3:
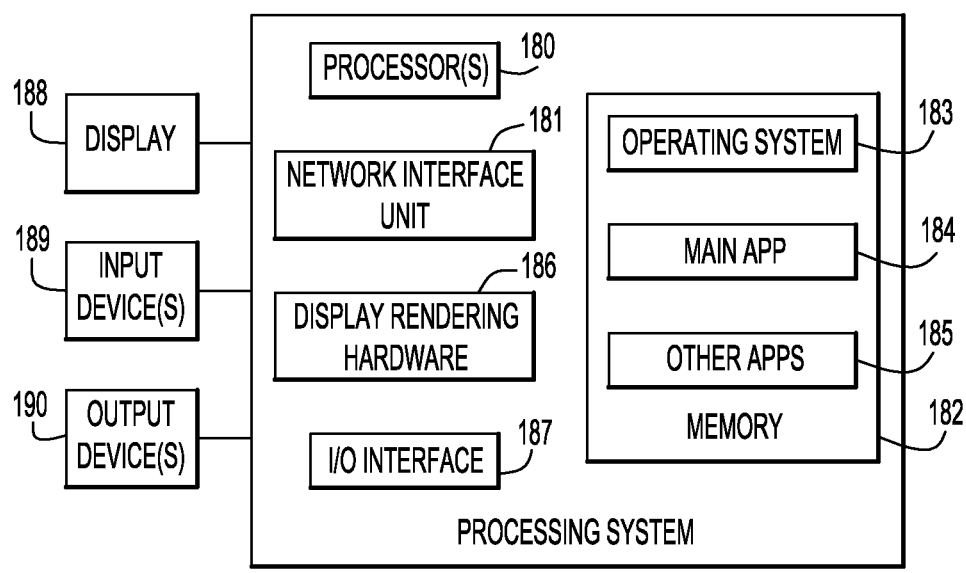
FIG. 3 is a block diagram illustrating a processing system that may be used in the computer systems of the present invention.

FIG. 3 depicts an example hardware implementation of a processing system such as a data integration system 110, target system 115 or end-user system 120 that may be used in system 100. The depicted processing system comprises one or more processors 180, a network interface unit 181, memory 182, display rendering hardware 186, and input/output interface 187. Resident in memory 182 are operating system 183, a main application 184 such as a database application, and optionally other applications 185. When the depicted processing system is an end-user system 120, the main application 184 may, for example, provide an interface such as a graphical user interface (GUI) for a user of the end-user system 120 to interact with the data integration system 110. Processor 180 is, for example, a data processing device such as a microprocessor, microcontroller, system on a chip (SOC), or other fixed or programmable logic, that executes instructions for process logic stored in memory 182. Network interface unit 181 enables communication to the platform or system 100. Memory 182 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Display rendering hardware 186 may be a part of processor 180, or may be, e.g., a separate Graphics Processor Unit (GPU).

I/O interface 187 enables communication between display device 188, input device(s) 189, and output device(s) 190, and the other components of the processing system, and may enable communication with these devices in any suitable fashion, e.g., via a wired or wireless connection. The display device 188 may be any suitable display, screen or monitor capable of displaying information to a user of the processing system, for example the screen of a tablet or the monitor attached to a computer workstation. Input device(s) 189 may include any suitable input device, for example, a keyboard, mouse, trackpad, touch input tablet, touch screen, camera, microphone, remote control, speech synthesizer, or the like. Output device(s) 190 may include any suitable output device, for example, a speaker, headphone, sound output port, or the like. The display device 188, input device(s) 189 and output device(s) 190 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

FIGS. 4A through 4E depict are diagrammatic illustrations of example data source tables comprising dimensional data according to various embodiments of the present invention. A dimension is a term in data management and data warehousing that refers to logical groupings of data such as geographic location, customer information, or product information. Dimensions may reference zero or more hierarchies. Hierarchies describe the relationship and structure of the referenced attributes that are grouped into levels, and provide a navigational and computational way to traverse the dimension. Related attributes and the joins that are required to group these attributes are defined in the properties of the dimension. Dimensions also have a type that describes if the dimension is time-oriented or non-time-oriented (regular). For example, a dimension called Time that contains levels like Year, Quarter, and Month is a Time type. Another dimension called Market that contains levels like Region, State, and City is a Regular type. Type information can be used by applications to intelligently and appropriately perform time-related functions.

Slowly changing dimensions (SCDs) are dimensions comprising data that changes slowly, rather than on a time-based or regular schedule. For example, a dimension may comprise information about a salesperson such as their business group, which may change over time if the salesperson moves to a different business group. Or, for example, a salesperson may change his or her last name as the result of a marriage or other life event. SCDs may be classified into one of several types, depending on how the changing dimension values are handled. Common types of SCDs include Type 0, Type 1, Type 2 and Type 3 SCDs.

Several SCD types are illustrated in FIGS. 4A through 4E, which depict salesperson tables 200*a* through 200*e* having multiple columns selected from the group including SALESPERS_KEY 205, SALESPERS_ID 210, SALESPER_FIRSTNAME 215, SALESPERS_LASTNAME 220, SALESPERS_SSN 225, BUSINESS_GROUP 230, START_DATE 235, END_DATE 240, VERSION 245, ORIGINAL_BUSINESS_GROUP 250, EFFECTIVE_DATE 255, and CURRENT_BUSINESS_GROUP 260. Although for any given table, each column may have a different SCD type, in the examples presented herein the SCD type will be discussed with reference to a subset of columns: SALESPERS_LASTNAME 220 and BUSINESS_GROUP 230 (or ORIGINAL_BUSINESS_GROUP 250 and CURRENT_BUSINESS_GROUP 260).

Each table 200*a* through 200*e* comprises one or more rows (records) for each salesperson, depending on the SCD type. Each row comprises one or more natural keys, and a surrogate key. A natural key is a candidate key that has a logical relationship to the attributes in the row. For example, in the depicted tables 200*a* through 200*e*, SALESPERS_SSN 225 is a natural key (also called a "business key") that uniquely identifies each salesperson, and that could be used as a primary key. In the depicted temporal tables, however, there may be more than one record associated with each salesperson (for example as shown in FIG. 4C) and thus SALESPERS_SSN 225 would be a poor choice for the primary key because it is not unique to each row. This problem may be solved by having a primary key comprise more than one column, or by creating a surrogate key, which is a unique key that has no logical relationship to the attributes in the row. For example, in the depicted tables, SALESPERS_KEY 205 is a surrogate key that uniquely identifies each row and can be used as the primary key.

FIG. 4A illustrates dimensional data having SCD Type 0. This SCD type represents an inactive or passive approach to managing dimension value changes, in which no action is taken when the dimension value changes. FIG. 4B illustrates dimensional data having SCD Type 1. This SCD type represents an approach in which old data is overwritten by new data, and which therefore does not track historical data. The differences between Type 0 and Type 1 may be understood by examining the row for salesperson "John Doe" in each of tables 200*a*, 200*b*. In table 200*a* (FIG. 4A), John Doe's BUSINESS_GROUP 230 column has a value of "SE", but in table 200*b* (FIG. 4B), this same column has a value of "NE." Thus, even though the data has changed over time (e.g., because John Doe moved from the SE business group to the NE business group), the value is not updated in table 200*a* because the dimension data in table 200*a* has SCD Type 0.

For a given table, each column may have a different SCD type. For example, examining the row for the salesperson having SALESPERS_KEY value "1003" in each of tables 200*a*, 200*b*, it can be seen that the salesperson named "Jane Smith" in table 200*a* (FIG. 4A) is the same person as the salesperson named "Jane Doe" in table 200*b* (FIG. 4B). The SALESPERS_LASTNAME 220 column in table 200*b* (FIG. 4B) has SCD Type 1, which is reflected by the change that has been made to the column value to reflect the current last name for this row. The SALESPERS_ID 210 column, however, has SCD Type 0, and no change has been made to the column value.

FIGS. 4C and 4D illustrate dimensional data having SCD Type 2. This SCD type represents an approach to managing dimension value changes that tracks historical data by creating multiple records for a given natural key. There are multiple ways to address Type 2 data, for example, in table 200*c* (FIG. 4C), START_DATE 235 and END_DATE 240 columns have been added to track which dimension values are associated with the specified time ranges. The current tuple version may be indicated by a null value in the END_DATE 240 column, as shown in table 200c, or may be indicated by a standardized "high date" such as 31-DEC-9999 or the like. Alternatively, Type 2 data may be addressed as is depicted in table 200d (FIG. 4D), where a VERSION 245 column has been added to track the different versions of the data over time. The version number may be incremented to indicate the sequence of changes.

The difference between these two approaches to SCD Type 2 data may be illustrated by examining the rows for salesperson "Juan Garcia" in each of tables 200c, 200d. Because Juan Garcia's business group has changed over time, there are multiple rows associated with him in each table, each row associated with a different surrogate key (e.g., SALESPERS_KEY 205 has a value of "1001" for the first row, a value of "2001" for the second row, and a value of "3001" for the third row). In table 200c (FIG. 4C), a comparison of the three rows for Juan Garcia reveals that he was a member of the SW business group from 4 Mar. 1997 to 20 Apr. 1999, a member of the PAC business group from 21 Apr. 1999 to 22 Feb. 2003, and a member of the MW business group from 21 Apr. 2003 to the present. Table 200d (FIG. 4D) illustrates a different approach to tracking the changing data. A comparison of the three rows for Juan Garcia in this table reveals that he was formerly a member of the SW business group (as indicated by the row having VERSION value "0"), was formerly a member of the PAC business group (as indicated by the row having VERSION value "1"), and is currently a member of the MW business group (as indicated by the row having VERSION value "2").

FIG. 4E illustrates dimensional data having SCD Type 3. This SCD type represents an approach to managing dimension value changes that tracks a limited amount of historical data by using three columns: ORIGINAL_BUSINESS_GROUP 250, EFFECTIVE_DATE 255, and CURRENT_BUSINESS_GROUP 260. Examining the row associated with salesperson "Juan Garcia" in table 200e, it can be seen that he was originally a member of the SW business group, but as of 23 Feb. 2003 he is a member of the MW business group. Comparing this table 200e to the SCD Type 2 tables 200c, 200d, it can be seen that the Type 3 data does not track all of the historical data. For example, there is no record in table 200e that Juan Garcia was a member of the PAC business group.

As can be understood from FIGS. 4A through 4E, dimensional data may comprise a number of slowly changing dimension (SCD) attributes, for example, surrogate key (e.g., SALESPERS_KEY 205 in table 200a), version attributes, start date and end date attributes, current and original (or previous) attributes, SCD type, calendar time, etc. For example, SCD Type 2 dimensions include either a version number attribute, or the start date and end date attributes. The version number attribute, for example the VERSION 245 column in table 200d (FIG. 4D), is used to keep track of the history of attribute changes. The start date and end date attributes, for example the START_DATE 235 and END_DATE 240 columns in table 200c (FIG. 4C), are used to identify the date from which the tuple values are valid or effective (start date), and the date until which the tuple values were effective (end date). If the tuple values are still valid, the end date may be set to null or a future date. SCD Type 3 dimensions include current and original (or previous) attributes, for example the CURRENT_BUSINESS_GROUP 260 and ORIGINAL_BUSINESS_GROUP 250 columns in table 200e (FIG. 4E) are used to track the history for the last change for a particular attribute. The calendar time attribute (not shown in FIG. 4) is used to keep track of time since or until a particular event, for example time from the start of a marketing campaign, or time until the end of the month.

FIGS. 5 through 12 depict various processes for handling slowly changing dimension (SCD) attributes in an ETL process, according to various embodiments of the present invention. Although each of these Figures and the accompanying descriptions refer to a single or pair of attributes (e.g., version attribute, or current and original attributes), it is understood that the present embodiments are not so limited, and that the processes may be performed on multiple attributes at the same or different times. For example, the various processes may run concurrently or sequentially, may be scheduled to run at periodic intervals or may be run on demand, or may run at any time and in any combination desired for a particular implementation.

Figure 5:
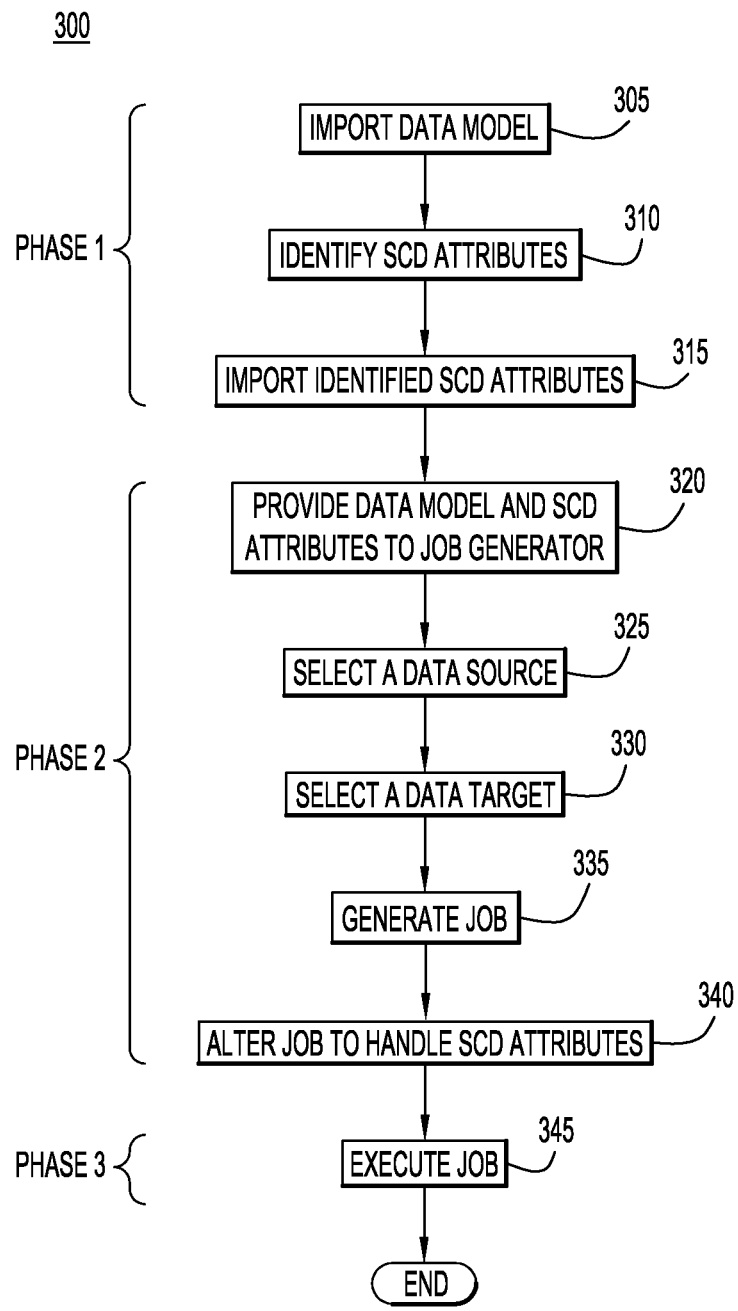
FIG. 5 is a flowchart depicting a process for handling slowly changing dimension (SCD) attributes in an ETL process, according to an embodiment of the present invention.

Referring now to FIG. 5, reference numeral 300 generally designates a flow chart depicting an example process for handling SCD attributes in an ETL process, according to an embodiment of the present invention. For ease of reference, the process 300 is described as being performed by the "system," but this reference is not limiting, and it is understood that this process 300 may be carried out by any suitable server, client or other device, and may be carried out by, e.g., the data integration system of FIGS. 1 and 2, one or more of the modules of FIG. 2 such as data discovery analyzer 165, or any other device, etc. Process 300 may be conceptualized as including three phases: Phase 1 in which a data model is imported and analyzed, Phase 2 in which ETL jobs are designed and generated, and Phase 3 in which the generated ETL jobs are executed. The phases may be performed in any suitable manner, for example as a continuous flow, or for example at different times, for example Phase 1 may be performed at one time to import the SCD attributes into the platform or system 100, and then the imported SCD attributes may be used at a later time (e.g., a day later or a week later) to perform Phases 2 and 3.

In step 305, the system imports the data model with dimensional characteristics from data modeling tool 150 or a data source 105 into the tool repository 160. In step 310, the system (and more particularly the data discovery analyzer 165) analyzes the data model to identify SCD attributes in the data model. The data model contains information about the data tables, including whether the tables are fact tables or dimension tables. A dimension table is a table that stores attributes that describe aspects of a dimension. For example, a time table stores the various aspects of time such as year, quarter, month, and day. A fact table is a table that stores facts that measure the business, such as sales, cost of goods, or profit. Fact tables also contain foreign keys to the dimension tables. These foreign keys relate each row of data in the fact table to its corresponding dimensions and levels. The data model also contains the physical model that comprises the names of the actual tables defined in the system.

In step 315 the system imports the identified SCD attributes into the tool repository 160, and in step 320 the system provides the imported data model and SCD attributes to the job generator 170. In step 325, the system selects a data source 105 from which to extract data. In step 330 the system selects a data target system 115, and in step 335 generates a job to extract, transform and load the data from the data source 105 into the target system 115. In step 340 the system alters the job to handle SCD attributes, for example by having a particular stage handle each SCD attribute. In the example data integration system 110 shown in FIG. 2, for example, the SCD stage 142 handles the start date and end date attributes, and the version stage 144 handles the version number (for example by analyzing the data, checking to determine if the version number value is a duplicate business key value, and if so, generating the next version number). The current/previous stage 146 handles the current and original (or previous) attributes, for example by, for each new tuple, identifying if a tuple with the same business key is present in the table. If yes, the stage 146 updates the same tuple with the values of the new tuple, moves the attribute value in the old tuple to the attribute corresponding to the "original" or "previous" flag, and updates the new value with the "current" flag. The transformer stage 148 handles the calendar time attribute, for example by finding the difference between the event and the time provided in the input. In step 345 the system executes the job.

Figure 6:
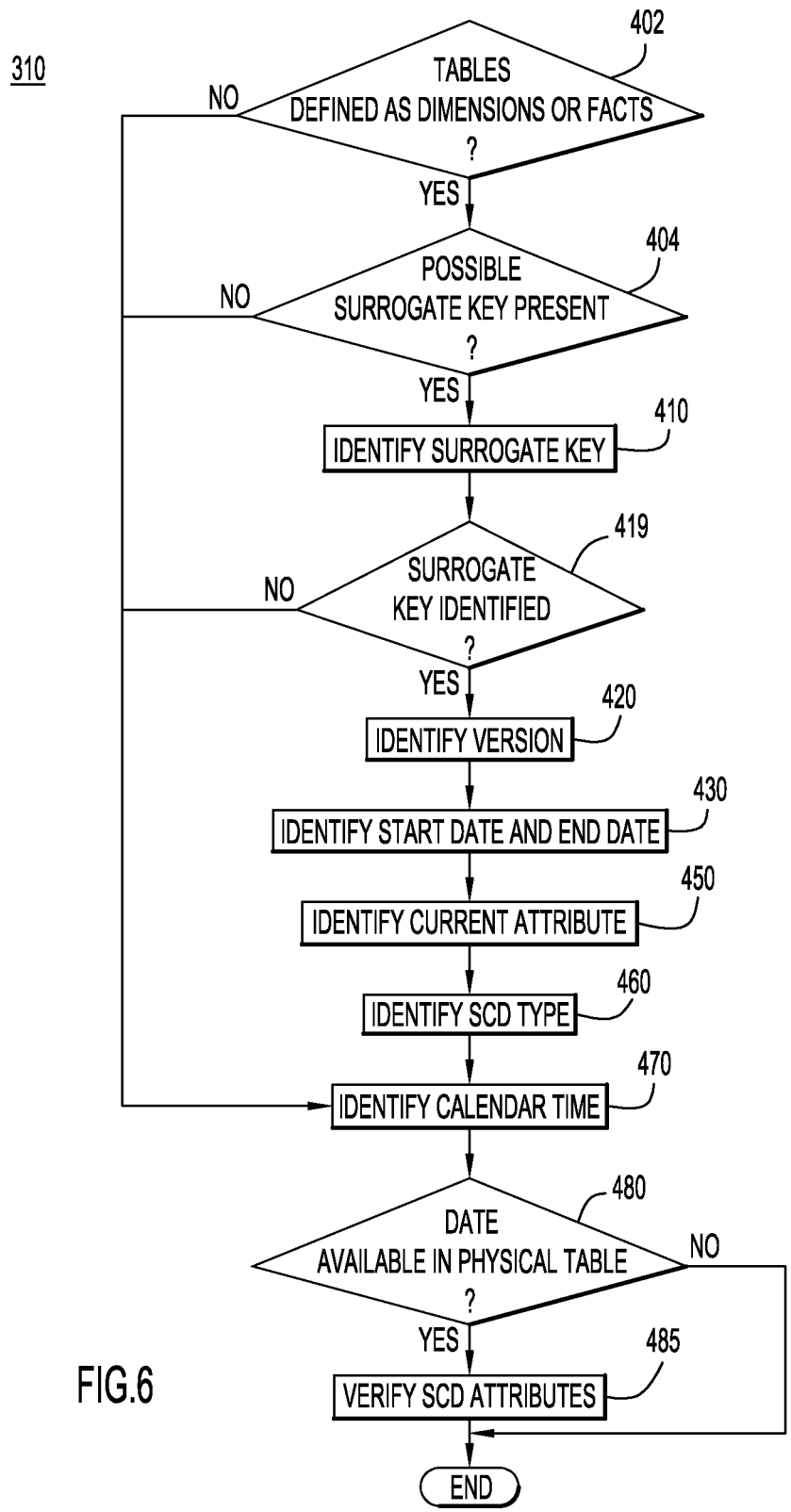
FIG. 6 is a flowchart depicting a process for identifying SCD attributes, according to an embodiment of the present invention.

FIG. 6 is a flowchart depicting a process 310 for identifying SCD attributes, according to an embodiment of the present invention. For ease of reference, the process 310 is described as being performed by the "system," but this reference is not limiting, and it is understood that this process 310 may be carried out by any suitable server, client or other device, and may be carried out by, e.g., the data integration system of FIGS. 1 and 2, one or more of the modules of FIG. 2 such as data discovery analyzer 165, or any other device, etc.

In step 402 the system determines if the tables in the data source have been defined as dimension tables or fact tables, and if yes proceeds to step 404, and if no proceeds to step 470. In step 404 the system determines if a possible or potential surrogate key is present, and if yes proceeds to step 410, and if not proceeds to step 470. In step 410, as is further described with respect to FIG. 7, the system identifies a surrogate key, and in step 419 the system determines if a surrogate key was identified, and if yes proceeds to step 420, and if no proceeds to step 470. In step 420, the system identifies one or more version attributes, as is further described with respect to FIG. 8, and then proceeds to step 430 in which the system identifies one or more start date and end date attributes, as is further described with respect to FIG. 9. The system then proceeds to step 450, where it identifies current and original (or previous) attributes as is further described with respect to FIG. 10, and then proceeds to step 460, where it identifies the SCD type as is further described with respect to FIG. 11. The system then proceeds to step 470, where it identifies the calendar time attribute, as is further described with respect to FIG. 12, before proceeding to step 480. As can be seen from FIG. 6, the system performs step 470 regardless of whether SCD attributes are present in the data, because the calendar time attribute is independent of SCD attributes.

In step 480 the system determines if there is data available in the physical table, and if yes proceeds to step 485, and if no ends process 310. In step 485, the system verifies the SCD attributes identified from the data model. For example, the system verifies the version attribute identification by verifying that the version number is different for those tuples that have the same business key. Also, for example, the system verifies that for tuples having the same business key, the start date and end date of the tuple are non-overlapping with other tuples, and the end date of at least one tuple is either null or larger than the current date. After verifying the SCD attributes, the system ends process 310.

Figure 7:
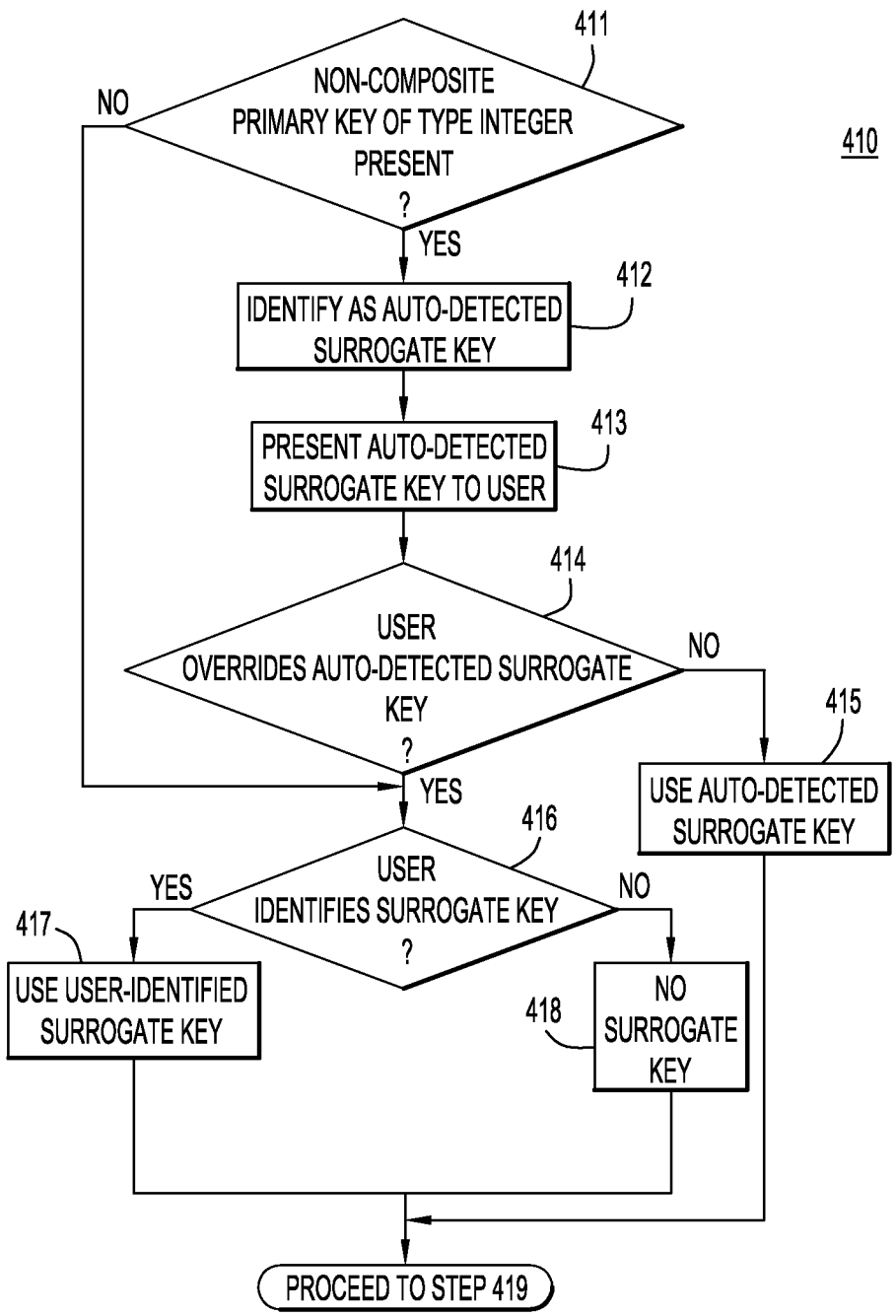
FIG. 7 is a flowchart depicting a process for identifying a surrogate key, according to an embodiment of the present invention.

FIG. 7 is a flowchart depicting a process 410 for identifying a surrogate key, according to an embodiment of the present invention. For ease of reference, the process 410 is described as being performed by the "system," but this reference is not limiting, and it is understood that this process 410 may be carried out by any suitable server, client or other device, and may be carried out by, e.g., the data integration system of FIGS. 1 and 2, one or more of the modules of FIG. 2 such as data discovery analyzer 165, or any other device, etc.

In step 411, the system determines if a non-composite (single column) primary key of type integer is present, and if yes proceeds to step 412, and if no proceeds to step 416. In step 412 the system identifies the non-composite primary key of type integer as an auto-detected surrogate key, and in step 413 presents the auto-detected surrogate key to the user, for example by displaying a message to a user of end user system 120, sending an email to a user, etc., and may receive input from the user, for example a confirmation or override of the auto-detected surrogate key. In step 414 the system determines if the user has overridden the auto-detected surrogate key, and if not, the system proceeds to step 415 and uses the auto-detected surrogate key as the surrogate key attribute, before proceeding to step 419 of process 310 (shown in FIG. 6). If yes, the system in step 416 determines if the user has identified a surrogate key, and if yes, the system proceeds to step 417 and uses the user-identified surrogate key as the surrogate key attribute, before proceeding to step 419 of process 310 (shown in FIG. 6). If not, the system proceeds to step 418 and notes that no surrogate key attribute has been identified, before proceeding to step 419 of process 310 (shown in FIG. 6).

Figure 8:
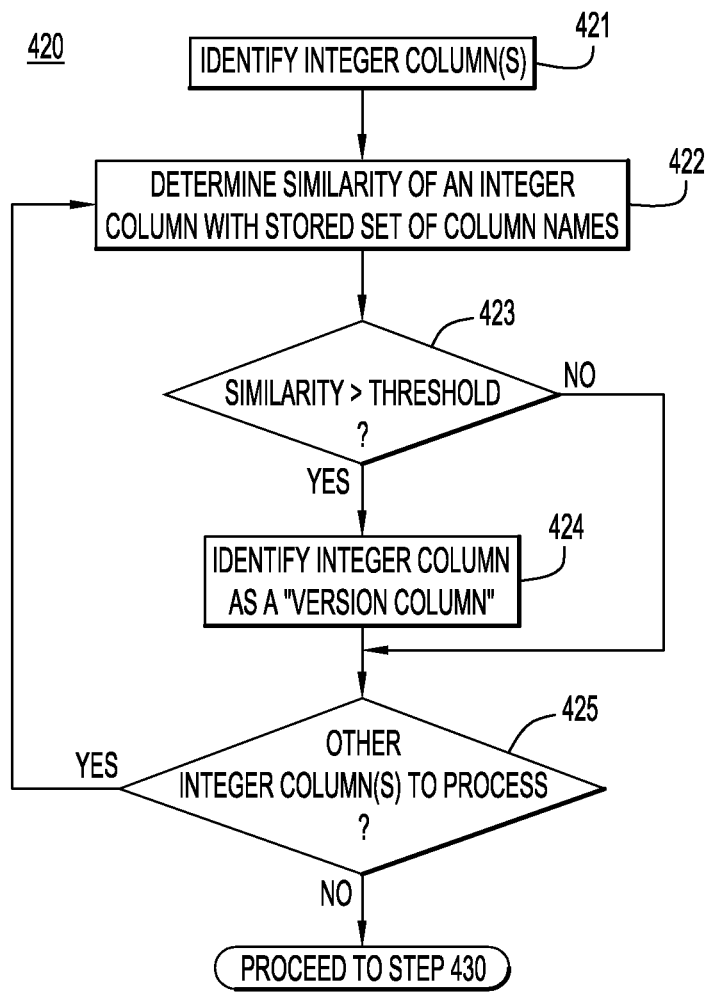
FIG. 8 is a flowchart depicting a process for identifying a version attribute, according to an embodiment of the present invention.

FIG. 8 is a flowchart depicting a process 420 for identifying a version attribute, according to an embodiment of the present invention. For ease of reference, the process 420 is described as being performed by the "system," but this reference is not limiting, and it is understood that this process 420 may be carried out by any suitable server, client or other device, and may be carried out by, e.g., the data integration system of FIGS. 1 and 2, one or more of the modules of FIG. 2 such as data discovery analyzer 165, or any other device, etc.

In step 421, the system identifies each of integer columns in the data model. The system then runs through a loop of steps 422 to 425 for each identified integer column. In step 422, the system determines the similarity score of a given integer column name with a stored set of column names. The stored set is an enumeration of the various names that may be used to represent the version attribute in a data source, for example, version, ver, sequence_no, seq_number, etc. The similarity score is determined using any suitable method for measuring similarity between two sequences which may vary in time or speed, for example Dynamic Time Warping (DTW), derivative Dynamic Time Warping, hidden Markov models, measurement of a Levenshtein distance between the given integer column and the names in the stored set, etc. In one embodiment, DTW is used. In step 423, the system determines if the similarity score between the given integer column name and at least one of the names in the stored set is above a predetermined threshold value. If yes, the system proceeds to step 424 and identifies the column as a "version column", and then proceeds to step 425, and if not, the system proceeds to step 425. In step 425, the system determines if there is another integer column to process, and if yes returns to step 422 to repeat the loop for that column, and if no the system proceeds to step 430 of process 310 (shown in FIG. 6).

Figure 9:
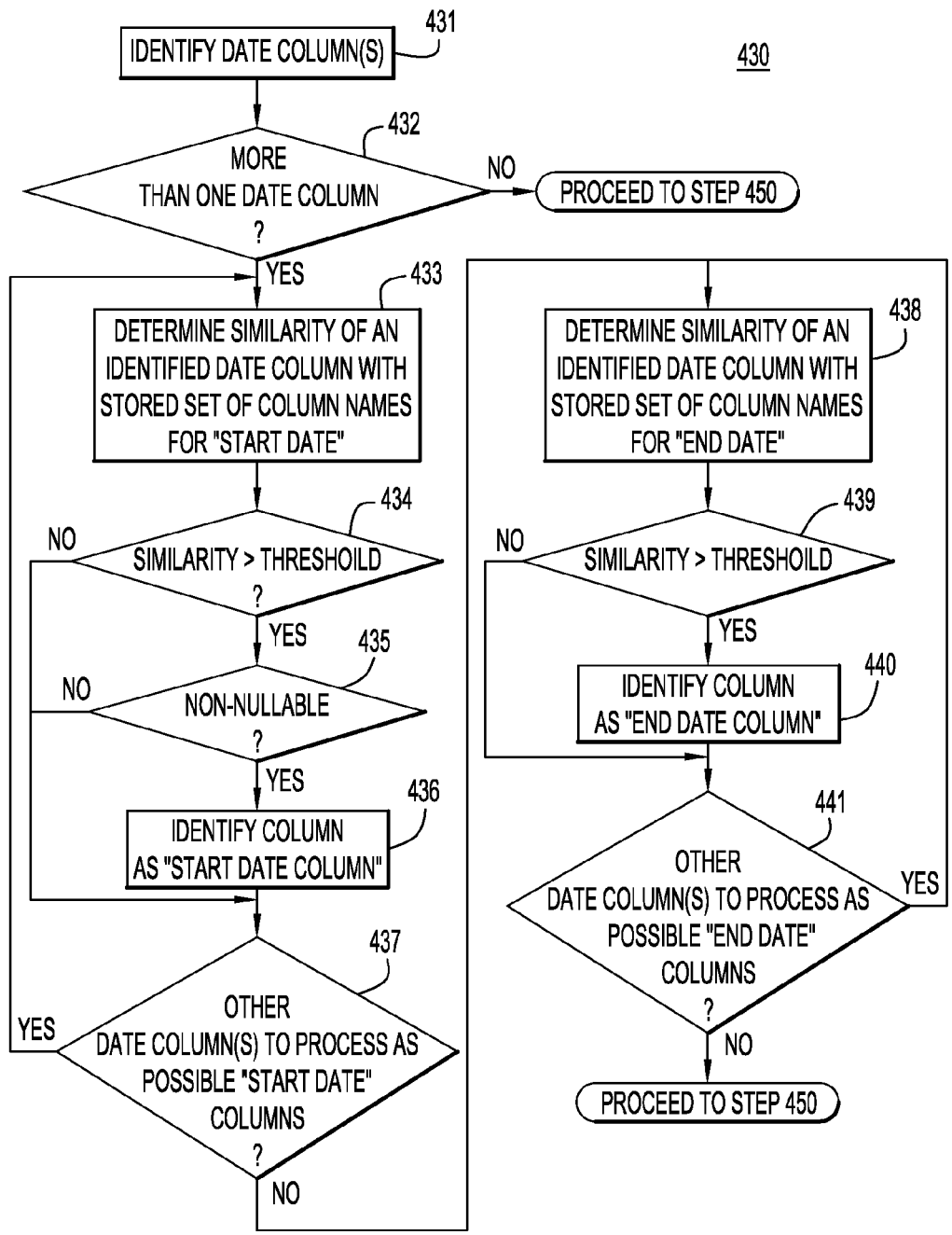
FIG. 9 is a flowchart depicting a process for identifying start date and end date attributes, according to an embodiment of the present invention.

FIG. 9 is a flowchart depicting a process 430 for identifying start date and end date attributes, according to an embodiment of the present invention. For ease of reference, the process 430 is described as being performed by the "system," but this reference is not limiting, and it is understood that this process 430 may be carried out by any suitable server, client or other device, and may be carried out by, e.g., the data integration system of FIGS. 1 and 2, one or more of the modules of FIG. 2 such as data discovery analyzer 165, or any other device, etc.

In step 431, the system identifies each of the date columns in the data model, and in step 432 determines if there is more than one data column in the data model. If not, the system proceeds to step 450 of process 310 (shown in FIG. 6), but if yes, the system proceeds to step 433. In step 433, the system determines the similarity score of a given date column name with a stored set of column names. The stored set is an enumeration of the various names that may be used to represent the start date attribute in a data source, for example, start_date, str_date, start_d, effective_date, etc. The similarity score is determined using any suitable method for measuring similarity between two sequences which may vary in time or speed, for example Dynamic Time Warping (DTW), derivative Dynamic Time Warping, hidden Markov models, measurement of a Levenshtein distance between the given date column and the names in the stored set, etc. In one embodiment, DTW is used. In step 434, the system determines if the similarity score between the given date column name and at least one of the names in the stored set is above a predetermined threshold value. If yes, the system proceeds to step 435, but if not the system proceeds to step 437. In step 435, the system determines if the given date column is non-nullable, and if yes the system proceeds to step 436 but if not the system proceeds to step 437. In step 436, the system identifies the given data column as a "start date" column, and then proceeds to step 437. In step 437, the system determines if there are any other date columns to process as possible start date columns, and if yes returns to step 433 to repeat the loop of steps 433 to 437 for the next column, and if not the system proceeds to step 438.

In step 438, the system determines the similarity score of a given date column name with a stored set of column names. The stored set is an enumeration of the various names that may be used to represent the end date attribute in a data source, for example, end_date, 1st_date, end_d, etc. The similarity score is determined using any suitable method for measuring similarity between two sequences which may vary in time or speed, for example Dynamic Time Warping (DTW), derivative Dynamic Time Warping, hidden Markov models, measurement of a Levenshtein distance between the given date column and the names in the stored set, etc. In one embodiment, DTW is used. In step 439, the system determines if the similarity score between the given date column name and at least one of the names in the stored set is above a predetermined threshold value. If yes, the system proceeds to step 440, but if not the system proceeds to step 441. In step 440, the system identifies the given data column as a "end date" column, and then proceeds to step 441. In step 441, the system determines if there are any other date columns to process as possible end date columns, and if yes returns to step 438 to repeat the loop of steps 438 to 441 for the next column, and if not the system proceeds to step 450 of process 310 (shown in FIG. 6).

Figure 10:
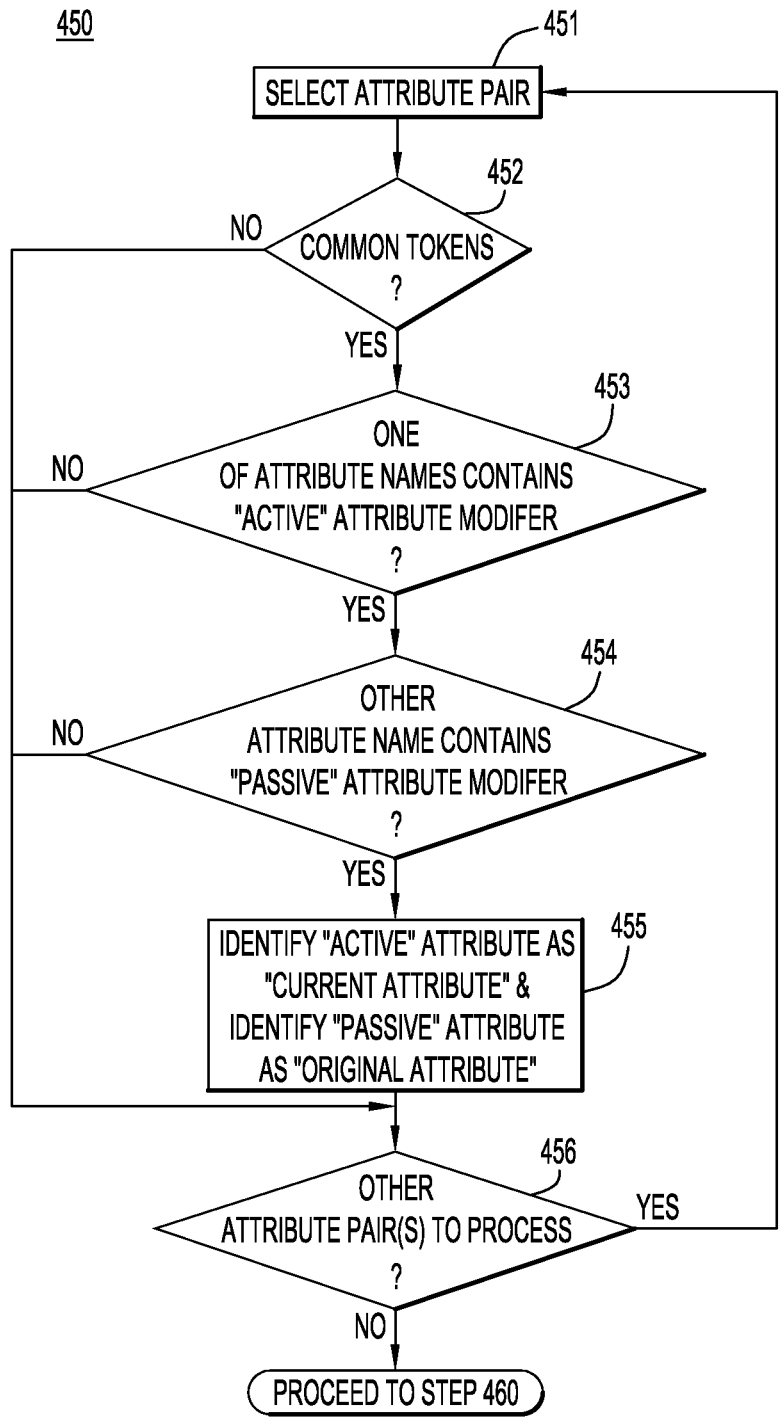
FIG. 10 is a flowchart depicting a process for identifying current and original attributes, according to an embodiment of the present invention.

FIG. 10 is a flowchart depicting a process 450 for identifying current and original attributes, according to an embodiment of the present invention. For ease of reference, the process 450 is described as being performed by the "system," but this reference is not limiting, and it is understood that this process 450 may be carried out by any suitable server, client or other device, and may be carried out by, e.g., the data integration system of FIGS. 1 and 2, one or more of the modules of FIG. 2 such as data discovery analyzer 165, or any other device, etc.

In step 451, the system scans each attribute pair within a table and in step 452 determines if the pair has common tokens. If yes, the system proceeds to step 453 and if no the system proceeds to step 456. The determination of whether the pair has common tokens is performed by comparing the attribute names of each column in the attribute pair to see if they comprise common tokens, for example the attribute pair ORIGINAL_BUSINESS_GROUP 250 and CURRENT_BUSINESS_GROUP 260 in table 200e of FIG. 4E both comprise the common tokens BUSINESS and GROUP. In step 453, the system determines if one of the attribute names contains an "active" attribute modifier, such as current, curr, present, etc., and if yes, proceeds to step 454 and if not, proceeds to step 456. In step 454, the system determines if the other attribute name contains a "passive" attribute modifier, such as original, orig, prior, previous, etc. and if yes proceeds to step 455 and if not proceeds to step 456. In step 455, the system identifies the attribute having an "active" attribute modifier in its name as the current attribute, and the attribute having a "passive" attribute modifier in its name as the original (or previous) attribute, and then in step 456 the system determines if there are any other attribute pairs to compare. If so, the system returns to step 451 to repeat the process 450 for the next attribute pair, and if not, the system proceeds to step 460 of process 310 (shown in FIG. 6).

Figure 11:
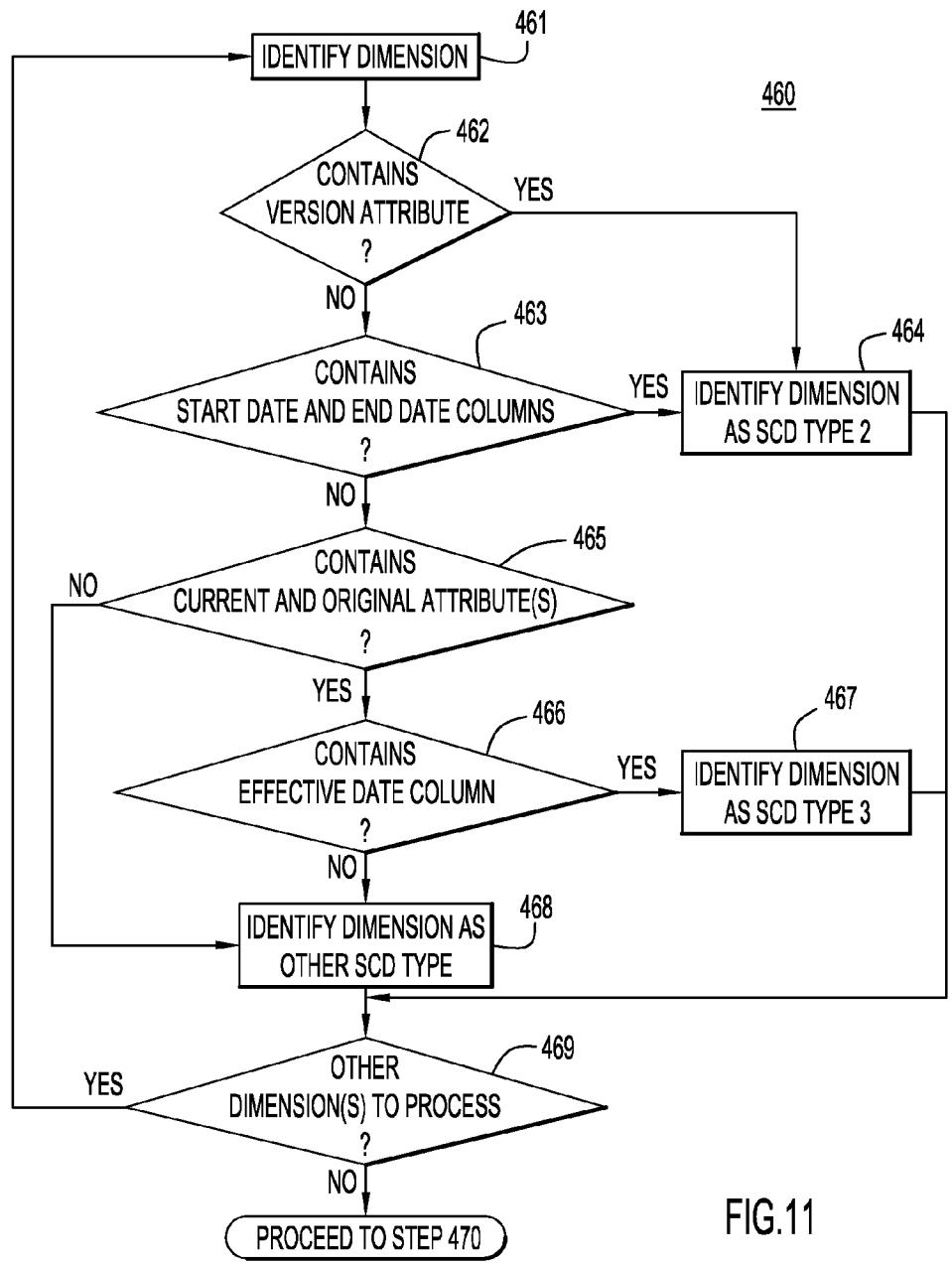
FIG. 11 is a flowchart depicting a process for identifying an SCD type, according to an embodiment of the present invention.

FIG. 11 is a flowchart depicting a process 460 for identifying an SCD type, according to an embodiment of the present invention. For ease of reference, the process 460 is described as being performed by the "system," but this reference is not limiting, and it is understood that this process 460 may be carried out by any suitable server, client or other device, and may be carried out by, e.g., the data integration system of FIGS. 1 and 2, one or more of the modules of FIG. 2 such as data discovery analyzer 165, or any other device, etc.

In step 461, the system identifies a dimension, and in step 462 determines if the dimension comprises a version attribute, and if not proceeds to step 463, and if yes, proceeds to step 464 and identifies the dimension as having SCD type 2, before proceeding to step 469. In step 463, the system determines if the dimension comprises start date and end date columns, and if not proceeds to step 465, and if yes, proceeds to step 464 and identifies the dimension as having SCD type 2, before proceeding to step 469. In step 465, the system determines if the dimension comprises current and original (or previous) attributes, and if not proceeds to step 468, and if yes, proceeds to step 466. In step 466, the system determines if the dimension comprises an effective date column, and if yes proceeds to step 467 but if no proceeds to step 468. In step 467, the system identifies the dimension as having SCD type 3, before proceeding to step 469. In step 468, the system identifies the dimension as having another SCD type (e.g., type 0 or type 1), and then proceeds to step 469. In step 469, the system determines if there is another dimension to process, and if yes returns to step 461 to repeat the process 460 for the next dimension, and if not, the system proceeds to step 470 of process 310 (shown in FIG. 6).

Figure 12:
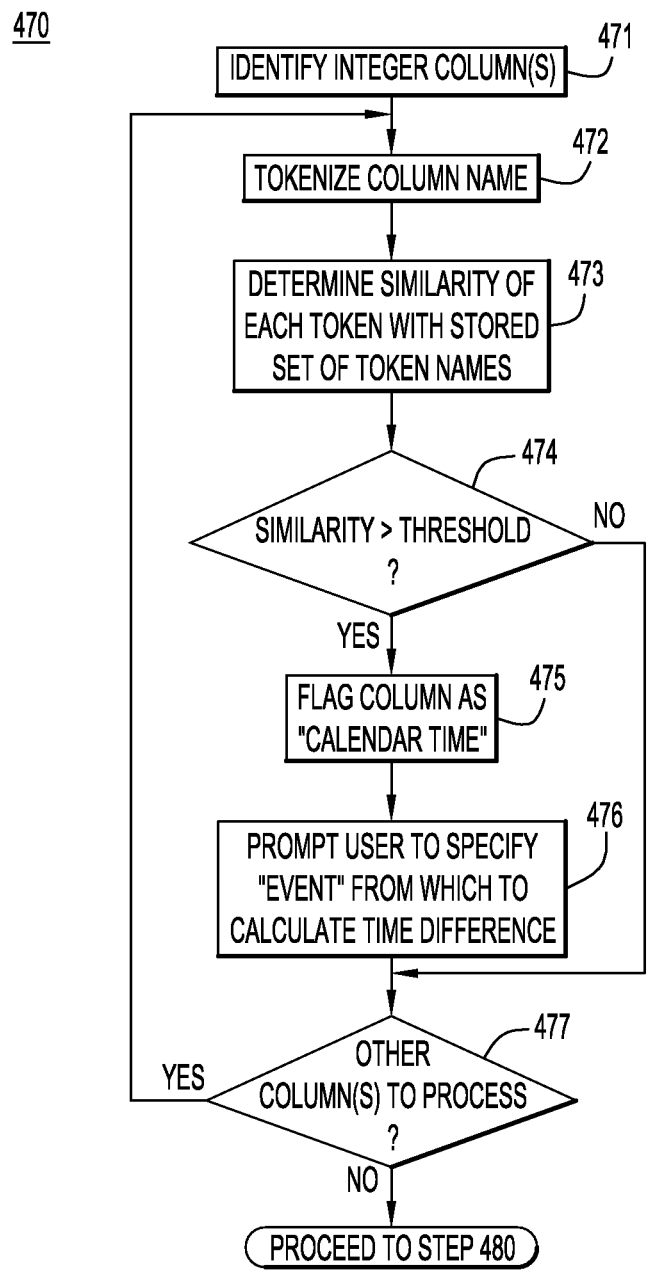
FIG. 12 is a flowchart depicting a process for identifying a calendar time attribute, according to an embodiment of the present invention.

FIG. 12 is a flowchart depicting a process 470 for identifying a calendar time attribute, according to an embodiment of the present invention. For ease of reference, the process 470 is described as being performed by the "system," but this reference is not limiting, and it is understood that this process 470 may be carried out by any suitable server, client or other device, and may be carried out by, e.g., the data integration system of FIGS. 1 and 2, one or more of the modules of FIG. 2 such as data discovery analyzer 165, or any other device, etc.

In step 471, the system identifies each of the integer columns in the data model. The system then runs through a loop of steps 472 to 477 for each identified integer column. In step 472, the system tokenizes the column name, for example tokenizing the column name "Time_to_GA" into three tokens "Time" "To" and "GA." In step 473, the system determines the similarity score of each token in a given integer column name with a stored set of token names. The stored set is an enumeration of the various names that may be used to represent the time or calendar attribute in a data source, for example, time, countdown, etc. The similarity score is determined using any suitable method for measuring similarity between two sequences which may vary in time or speed, for example Dynamic Time Warping (DTW), derivative Dynamic Time Warping, hidden Markov models, measurement of a Levenshtein distance between the given token and the tokens in the stored set, etc. In one embodiment, DTW is used. In step 474, the system determines if the similarity score between the token in the given integer column name and at least one of the tokens in the stored set is above a predetermined threshold value. If yes, the system proceeds to step 475 and flags the column as a "calendar time" column, and then proceeds to step 476, and if not, the system proceeds to step 477. In step 476, the system prompts the user to provide or specify an "event" from which to calculate a time difference, for example if the column name is "time_to_Q_End" the user may provide the date of the quarter end. In step 477, the system determines if there is another integer column to process, and if yes returns to step 472 to repeat the loop for that column, and if no the system proceeds to step 480 of process 310 (shown in FIG. 6).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Smalltalk, C++ or the like, or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of identifying and handling slowly changing dimension (SCD) attributes for use with an Extract, Transform, Load (ETL) process, comprising:
    importing a data model for dimensional data into a data integration system, wherein the dimensional data comprises a plurality of attributes for one or more dimensions;
    analyzing the data model and identifying, via a data discovery analyzer, one or more attributes in the data model as SCD attributes, wherein the identifying includes identifying at least one attribute in the data model as an SCD attribute based on a comparison of a name of the at least one attribute to a stored set of names used for SCD attributes;
    importing the identified SCD attributes into the data integration system;
    selecting a data source comprising dimensional data;
    automatically generating an ETL job for the dimensional data utilizing the imported SCD attributes; and
    executing the automatically generated ETL job to extract the dimensional data from the data source and loading the dimensional data into the imported SCD attributes in a target data system.

2. The method of claim 1, wherein each SCD attribute is associated with a set of conditions for values of that SCD attribute, and the method further comprising:
    verifying the identified SCD attributes in the data model against the associated sets of conditions by comparing values for each identified SCD attribute from data present in one or more physical data tables in a data source to at least one of each other and a reference value to determine compliance of that identified SCD attribute with the corresponding set of conditions.

3. The method of claim 1, wherein the one or more SCD attributes are selected from the group consisting of surrogate key, version, start date, end date, current, original, SCD type, and calendar time.

4. The method of claim 1, wherein the identifying one or more attributes in the data model as SCD attributes further comprises:
    determining a data type of an attribute in the dimensional data; and
    analyzing the data type to identify an SCD attribute.

5. The method of claim 1, wherein the identifying one or more attributes in the data model as SCD attributes further comprises:
    determining a similarity score measuring the similarity of an attribute name for an attribute in the plurality of attributes with a stored attribute name;
    if the similarity score is above a predetermined threshold score, identifying the attribute as an SCD attribute.

6. The method of claim 1, wherein an SCD type for a dimension contains a corresponding set of SCD attributes, and the method further comprising:

identifying the SCD type for each dimension in the data model with identified SCD attributes by comparing the identified SCD attributes in the data model for that dimension with the corresponding sets of SCD attributes associated with the SCD types.

7. The method of claim 1, wherein the identifying one or more attributes in the data model as SCD attributes further comprises:

comparing a first attribute name for a first attribute in the plurality of attributes with a second attribute name for a second attribute in the plurality of attributes to determine if the first and second attribute names comprise common tokens; and if the first and second attribute names comprise common tokens, identifying the first and second attributes as SCD attributes if one of the first and second attribute names comprises an active attribute modifier and the other of the first and second attribute names comprises a passive attribute modifier.

8. A computer program product for identifying and handling slowly changing dimension (SCD) attributes for use with an Extract, Transform, Load (ETL) process, comprising:

a computer readable storage medium having computer readable program code embodied therewith, the computer readable program code comprising computer readable program code configured to:

import a data model for dimensional data into a data integration system, wherein the dimensional data comprises a plurality of attributes for one or more dimensions;

analyze the data model and identify, via a data discovery analyzer, one or more attributes in the data model as SCD attributes, wherein the identifying includes identifying at least one attribute in the data model as an SCD attribute based on a comparison of a name of the at least one attribute to a stored set of names used for SCD attributes;

import the identified SCD attributes into the data integration system;

select a data source comprising dimensional data;

automatically generate an ETL job for the dimensional data utilizing the imported SCD attributes; and execute the automatically generated ETL job to extract the dimensional data from the data source and load the dimensional data into the imported SCD attributes in a target data system.

9. The computer program product of claim 8, wherein each SCD attribute is associated with a set of conditions for values of that SCD attribute, and the computer readable program code is further configured to:

verify the identified SCD attributes in the data model against the associated sets of conditions by comparing values for each identified SCD attribute from data present in one or more physical data tables in a data source to at least one of each other and a reference value to determine compliance of that identified SCD attribute with the corresponding set of conditions.

10. The computer program product of claim 8, wherein the one or more SCD attributes are selected from the group consisting of surrogate key, version, start date, end date, current, original, SCD type, and calendar time.

11. The computer program product of claim 8, wherein the identifying one or more attributes in the data model as SCD attributes comprises the computer readable program code being further configured to:

determine a data type of an attribute in the dimensional data; and analyze the data type to identify an SCD attribute.

12. The computer program product of claim 8, wherein the identifying one or more attributes in the data model as SCD attributes comprises the computer readable program code being further configured to:

determine a similarity score measuring the similarity of an attribute name for an attribute in the plurality of attributes with a stored attribute name;

if the similarity score is above a predetermined threshold score, identify the attribute as an SCD attribute.

13. The computer program product of claim 8, wherein an SCD type for a dimension contains a corresponding set of SCD attributes, and the computer readable program code being further configured to:

identify the SCD type for each dimension in the data model with identified SCD attributes by comparing the identified SCD attributes in the data model for that dimension with the corresponding sets of SCD attributes associated with the SCD types.

14. The computer program product of claim 8, wherein the identifying one or more attributes in the data model as SCD attributes comprises the computer readable program code being further configured to:

compare a first attribute name for a first attribute in the plurality of attributes with a second attribute name for a second attribute in the plurality of attributes to determine if the first and second attribute names comprise common tokens; and if the first and second attribute names comprise common tokens, identify the first and second attributes as SCD attributes if one of the first and second attribute names comprises an active attribute modifier and the other of the first and second attribute names comprises a passive attribute modifier.

15. A system for identifying and handling slowly changing dimension (SCD) attributes for use with an Extract, Transform, Load (ETL) process, comprising:

a memory; and a processor configured with logic to:

import a data model for dimensional data, wherein the dimensional data comprises a plurality of attributes for one or more dimensions;

store the data model in the memory;

analyze the data model and identify, via a data discovery analyzer, one or more attributes in the data model as SCD attributes, wherein the identifying includes identifying at least one attribute in the data model as an SCD attribute based on a comparison of a name of the at least one attribute to a stored set of names used for SCD attributes;

store the identified SCD attributes in the memory;

select a data source comprising dimensional data;

automatically generate an ETL job for the dimensional data utilizing the stored SCD attributes; and execute the automatically generated ETL job to extract the dimensional data from the data source and load the dimensional data into the stored SCD attributes in a target data system.

16. The system of claim 15, wherein each SCD attribute is associated with a set of conditions for values of that SCD attribute, and the processor is further configured with logic to:

verify the identified SCD attributes in the data model against the associated sets of conditions by comparing values for each identified SCD attribute from data present in one or more physical data tables in a data source to at least one of each other and a reference value to determine compliance of that identified SCD attribute with the corresponding set of conditions.

17. The system of claim 15, wherein the one or more SCD attributes are selected from the group consisting of surrogate key, version, start date, end date, current, original, SCD type, and calendar time, and wherein the identifying one or more attributes in the data model as SCD attributes comprises the processor being further configured with logic to:
    determine a data type of an attribute in the dimensional data; and
    analyze the data type to identify an SCD attribute.

18. The system of claim 15, wherein the identifying one or more attributes in the data model as SCD attributes comprises the processor being further configured with logic to:
    determine a similarity score measuring the similarity of an attribute name for an attribute in the plurality of attributes with a stored attribute name;
    if the similarity score is above a predetermined threshold score, identify the attribute as an SCD attribute.

19. The system of claim 15, wherein an SCD type for a dimension contains a corresponding set of SCD attributes, and the processor being further configured with logic to:
    identify the SCD type for each dimension in the data model with identified SCD attributes by comparing the identified SCD attributes in the data model for that dimension with the corresponding sets of SCD attributes associated with the SCD types.

20. The system of claim 15, wherein the identifying one or more attributes in the data model as SCD attributes comprises the processor being further configured with logic to:
    compare a first attribute name for a first attribute in the plurality of attributes with a second attribute name for a second attribute in the plurality of attributes to determine if the first and second attribute names comprise common tokens; and
    if the first and second attribute names comprise common tokens, identify the first and second attributes as SCD attributes if one of the first and second attribute names comprises an active attribute modifier and the other of the first and second attribute names comprises a passive attribute modifier.

\* \* \* \* \*